United States Patent
Scelers et al.

(10) Patent No.: US 7,363,138 B2
(45) Date of Patent: Apr. 22, 2008

(54) WHEEL SLIP DETECTION AND TORQUE MANAGEMENT

(75) Inventors: Herve Scelers, Illkirch-Graffenstaden (FR); Paul A. Bauerle, Fenton, MI (US); Ruobai Zhang, Ann Arbor, MI (US); Craig J. Hawkins, Milford, MI (US); Hiep T. Do, West Bloomfield, MI (US); Timothy J. Keenan, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 381 days.

(21) Appl. No.: 10/601,063

(22) Filed: Oct. 9, 2003

(65) Prior Publication Data

US 2005/0080547 A1 Apr. 14, 2005

(51) Int. Cl.
*G06F 17/00* (2006.01)
(52) U.S. Cl. .................. 701/82; 701/90; 180/197; 303/139
(58) Field of Classification Search ............... 701/71, 701/61, 51, 69, 74, 84, 87, 82, 90, 95, 96; 702/182, 148; 714/37; 303/144, 147, 151, 303/140, 122.01, 139, 185; 180/197, 244; 477/97; 475/205, 198
See application file for complete search history.

(56) References Cited

U.S. PATENT DOCUMENTS

| | | | |
|---|---|---|---|
| 4,939,656 A * | 7/1990 | Hoashi et al. ............... 701/83 |
| 5,025,882 A * | 6/1991 | Ghoneim et al. ........... 180/197 |
| 5,370,199 A * | 12/1994 | Akuta et al. ................ 180/197 |
| 5,400,865 A * | 3/1995 | Togai et al. ................ 180/197 |
| 5,513,907 A * | 5/1996 | Kiencke et al. ............ 303/150 |
| 5,518,307 A * | 5/1996 | Okazaki ..................... 303/159 |
| 5,636,909 A * | 6/1997 | Hirao et al. ................ 303/140 |
| 5,729,455 A * | 3/1998 | Yamashita et al. ......... 303/139 |
| 5,765,657 A * | 6/1998 | Fukumura et al. .......... 180/197 |
| 6,123,164 A * | 9/2000 | Hrovat ....................... 180/197 |
| 6,182,022 B1 | 1/2001 | Mayle et al. ............... 702/182 |
| 6,505,139 B1 * | 1/2003 | Koga et al. ................. 702/148 |
| 6,709,071 B2 * | 3/2004 | Fukami ................... 303/113.3 |
| 2002/0072449 A1 * | 6/2002 | Iwase et al. ................. 477/97 |

OTHER PUBLICATIONS

"Improved acceleration based wheel slip detection and torque management", Defensive Publication Research Disclosure Publication No. 464034, Research Disclosure 2002, p. 2268.

* cited by examiner

*Primary Examiner*—Tuan C To

(57) ABSTRACT

A method of controlling traction in a vehicle having at least one non-driven wheel speed sensor. Actual vehicle acceleration and a wheel speed difference are detected. At least one of the actual vehicle acceleration and the wheel speed difference is compared to at least one of a predetermined vehicle acceleration and a predetermined wheel speed difference to detect vehicle wheel slip. A wheel torque is reduced in response to detected wheel slip. The foregoing method allows traction control to be installed in many types of vehicles, including vehicles without ABS. More than one type of wheel slip detection can be implemented, and various types of wheel slip can be detected.

14 Claims, 5 Drawing Sheets

WHEEL SLIP DETECTION AND TORQUE MANAGEMENT

FIELD OF THE INVENTION

The present invention relates to traction control in motor vehicles and, more particularly, to wheel slip detection and torque management in motor vehicles.

BACKGROUND OF THE INVENTION

As a motor vehicle is being driven, it is not uncommon for one of the driven wheels to lose its grip on the road. To promote safety, traction control systems have been developed for detecting wheel spin and reducing wheel torque in response to wheel spin. In one such system, described in U.S. Pat. No. 6,182,002 B1, vehicle acceleration is measured and used to detect wheel spin. In other systems, wheel speeds may be monitored to detect wheel spin. For example, in many vehicles having anti-lock brake systems (ABS), wheel speed sensors may be used to provide information to a traction control system. Each of the foregoing detection methods has its own advantages, and the types of slippage detected can differ depending on the detection method used.

SUMMARY OF THE INVENTION

The present invention, in one embodiment, is directed to a method of controlling traction in a vehicle having at least one non-driven wheel speed sensor. The method includes detecting at least one of actual vehicle acceleration and a wheel speed difference, comparing said at least one of said actual vehicle acceleration and said wheel speed difference to at least one of a predetermined vehicle acceleration and a predetermined wheel speed difference to detect vehicle wheel slip, and reducing wheel torque in response to said detected wheel slip.

The present invention, in another embodiment, is directed to a vehicle having at least one non-driven wheel speed sensor and including a processor configured to control traction. The processor is configured to detect at least one of vehicle acceleration and a wheel speed difference, compare at least one of said vehicle acceleration and said wheel speed difference to at least one of a predetermined vehicle acceleration and a predetermined wheel speed difference to detect vehicle wheel slip, and reduce wheel torque in response to said detected wheel slip.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
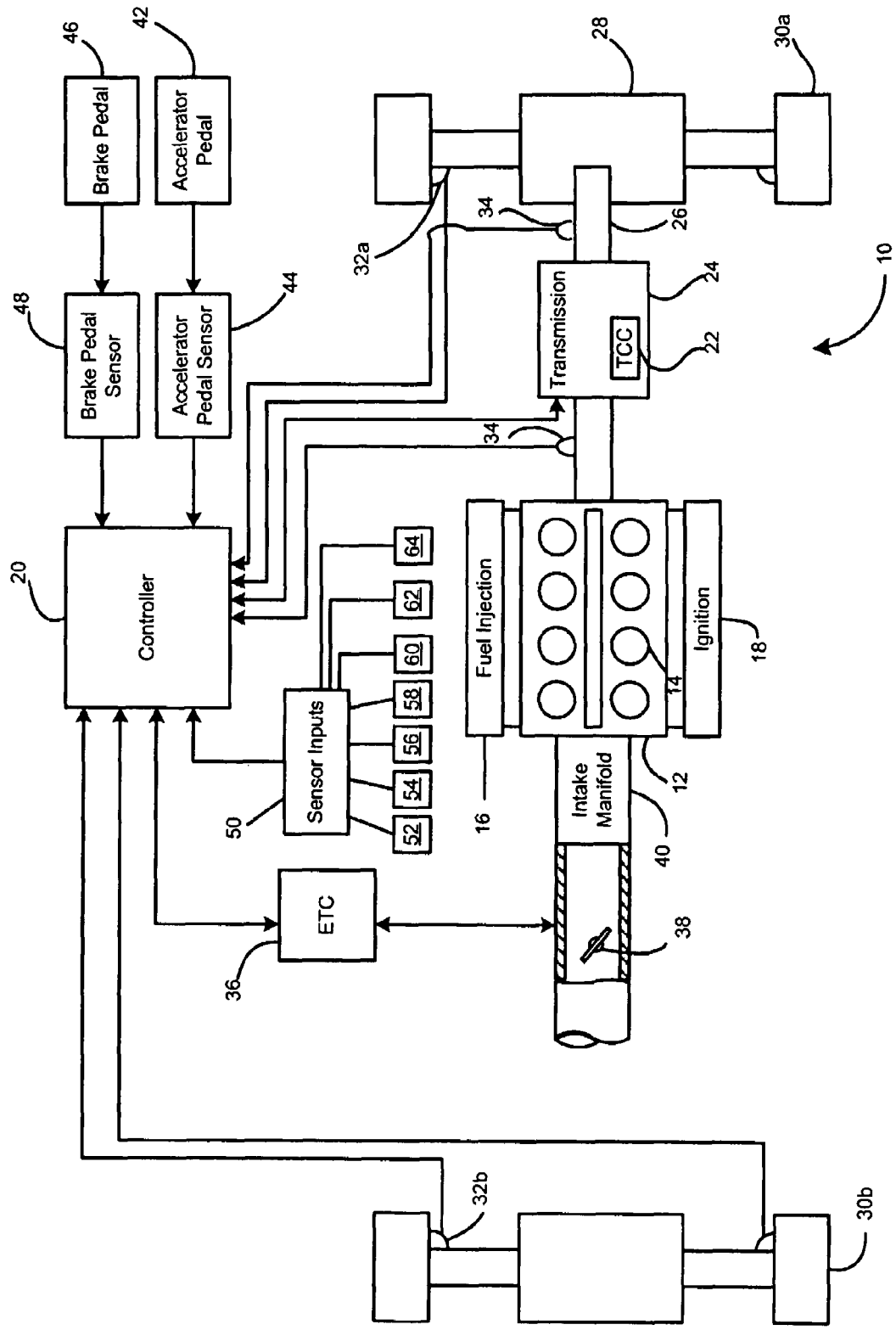
FIG. 1 is a functional block diagram of a vehicle including a traction control system according to one embodiment of the present invention.

A vehicle having a traction control system in accordance with one embodiment is referred to generally in FIG. 1 by reference number 10. The vehicle 10 includes an engine 12 having a plurality of cylinders 14, each with one or more intake valves and/or exhaust valves (not shown). The engine 12 is configured with a fuel injection system 16 and an ignition system 18. An output of the engine 12 is coupled by a torque converter 22, a multiple-speed ratio transmission 24, a driveshaft 26 and a differential 28 to driven front wheels 30a. Rear wheels 30b are non-driven in the present embodiment. The transmission 24 is controlled by a controller 20.

One or more wheel speed sensors 32 transmit speed signal(s) to the controller 20. In the embodiment shown in FIG. 1, driven wheels 30a and non-driven wheels 30b have speed sensors 32a and 32b respectively. In other embodiments, fewer than four wheel speed sensors may be provided. For example, one sensor is used on one of the non-driven wheels. Shaft speed sensors 34 transmit input signals to the controller 20.

An electronic throttle controller (ETC) 36 adjusts a throttle 38 in an intake manifold 40 based upon a position of an accelerator pedal 42 and a throttle control algorithm that is executed by the controller 20. The throttle 38 adjusts an output torque that drives the wheels 30a. One or more sensors (not shown), for example a manifold pressure sensor and a manifold air temperature sensor, may be provided in the intake manifold 40.

An accelerator pedal sensor 44 generates a pedal position signal that is output to the controller 20 based on a position of an accelerator pedal 42. A position of a brake pedal 46 is sensed by a brake pedal sensor 48, which generates a brake pedal position signal that is output to the controller 20. Other sensor inputs collectively indicated by reference number 50 are used by the controller 20 for traction control. Such inputs include a signal 52 indicating engine speed, a vehicle speed signal 54, an accelerator position signal 56 and a throttle position signal 58. One such signal to the controller 20, a trans throttle signal 60, indicates throttle pressure in the transmission 24. Signals 62 and 64 indicate transmission input and output pulley speeds.

Figure 2A:
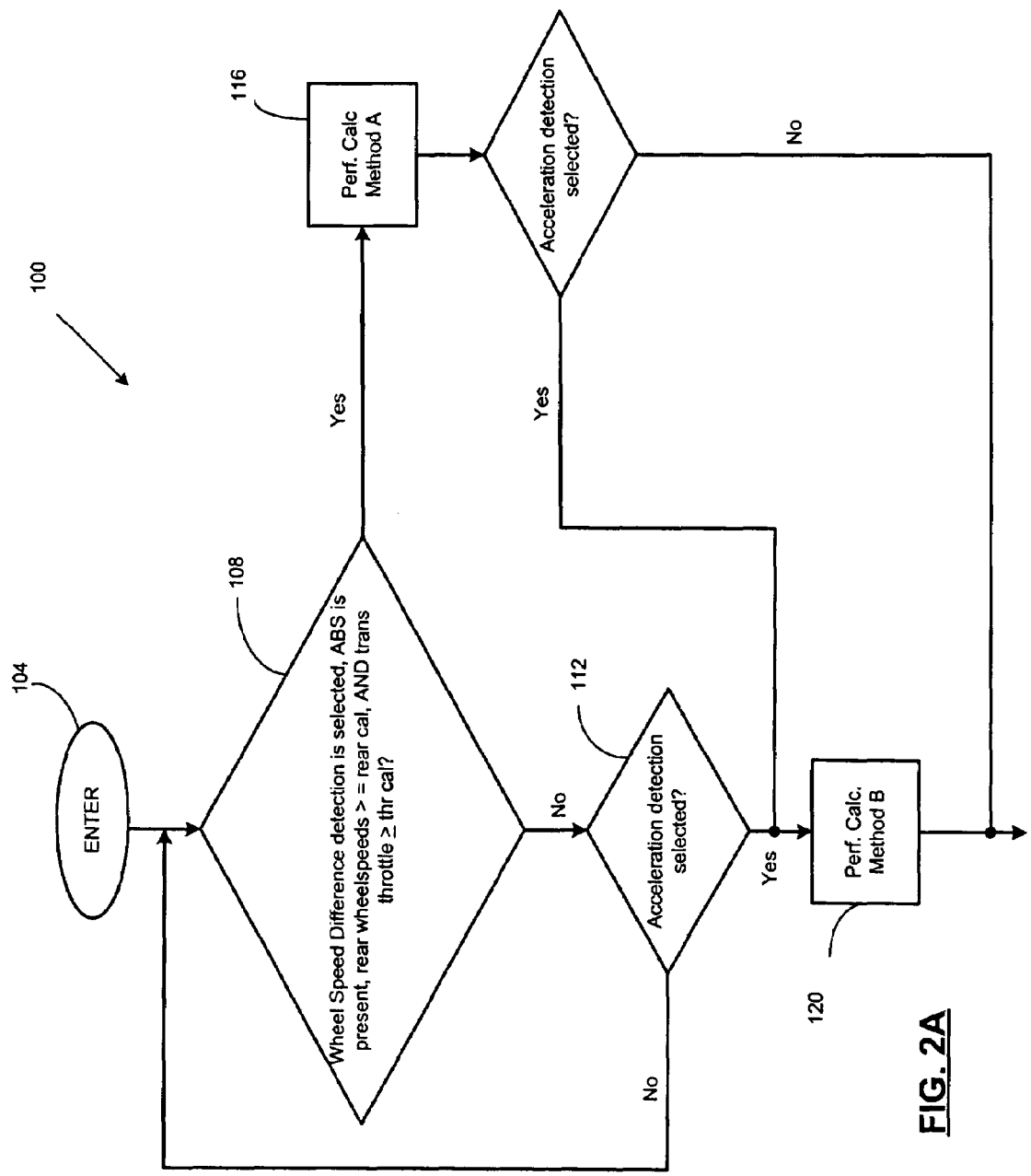
FIG. 2A is a flow diagram illustrating steps for controlling traction in a vehicle according to one embodiment of the present invention.

An embodiment of a method of controlling traction in a motor vehicle is referred to generally by reference number 100 in FIGS. 2A-D. The method 100 is embodied, for example, in software executed by the controller 20. Referring now to FIG. 2A, the routine 100 is entered in step 104. In step 108, the controller 20 determines whether wheel speed-based wheel slip detection is to be performed as further described below. In step 112, the controller 20 determines whether acceleration-based wheel slip detection is to be performed, also further described below.

Specifically, in step 108 the controller 20 determines whether wheel speed difference detection is selected, whether an anti-lock brake system (ABS) is present, whether a non-driven wheel speed equals or exceeds a threshold non-driven wheel speed value, and whether the trans throttle signal 60 equals or exceeds a threshold throttle value. If yes, the controller executes wheel speed-based wheel slip detection in step 116. If no, the controller 20 executes acceleration-based wheel slip detection in step 120.

Figure 2B:
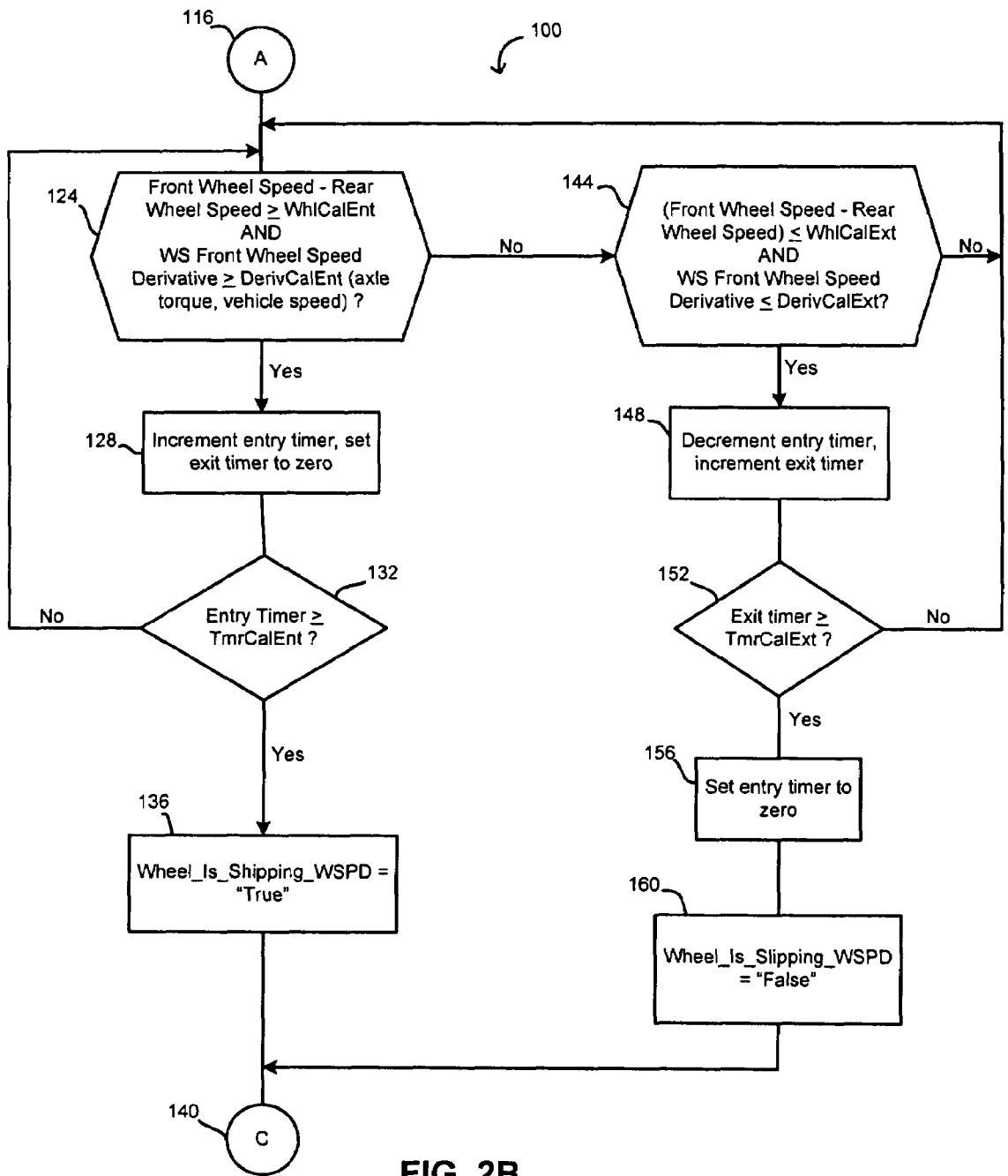
FIG. 2B is a flow diagram illustrating steps for controlling traction in a vehicle according to one embodiment of the present invention.

Wheel speed difference detection is described with reference to FIGS. 1 and 2B. In the present embodiment, wheel slip occurs when two conditions are met. A first condition is present when a difference is detected between a non-driven rear wheel speed and a driven front wheel speed. A second condition is present when a front wheel speed acceleration exceeds a maximum acceleration achievable by the vehicle for current conditions. Thus, the controller 20 determines whether a speed difference between a driven front wheel 30a and a non-driven rear wheel 30b equals or exceeds a calibration value WhlCalEnt. The value WhlCalEnt, and other predetermined values described further below, may be stored in memory associated with the controller 20.

In the present exemplary embodiment, the controller 20 also uses wheel speed acceleration in detecting wheel slip. Accordingly, the controller 20 also determines in step 124 whether a driven wheel speed acceleration equals or exceeds a predetermined value. For example, the controller determines whether a front wheel speed derivative equals or exceeds a calibration value DerivCalEnt, where DerivCalEnt is a function of axle torque and vehicle speed.

If both WhlCalEnt and DerivCalEnt are equaled and/or exceeded, the controller 20 increments a wheel-speed-case entry timer and sets a wheel-speed-case exit timer to zero in step 128. In step 132, the controller 20 determines whether the entry timer has reached a calibration value TmrCalEnt. If not, control returns to step 124. When the entry timer has exceeded TmrCalEnt, a signal Wheel_Is_Slipping_WSPD is set to "True" in step 136. The controller performs torque management, as will be described further below in conjunction with FIG. 2D.

If step 124 is false, the controller 20 determines whether the wheel speed difference between the front wheel 30a and the rear wheel 30b is less than or equal to a calibration value WhlCalExt in step 144. The controller 20 also determines whether the front wheel speed derivative is less than or equal to a calibration value DerivCalExt, which is a function of axle torque and vehicle speed. If false, the controller 20 returns to step 116. If true, the controller 20 decrements the entry timer and increments the exit timer in step 148. If the exit timer is less than a calibration value TmrCalExt in step 152, the controller 20 returns to step 116. If the exit timer equals or exceeds TmrCalExt, the entry timer is set to zero in step 156. In step 160, a signal Wheel_Is_Slipping_WSPD is set to "False". The controller proceeds to perform torque management, as further described below in conjunction with FIG. 2D.

Figure 2C:
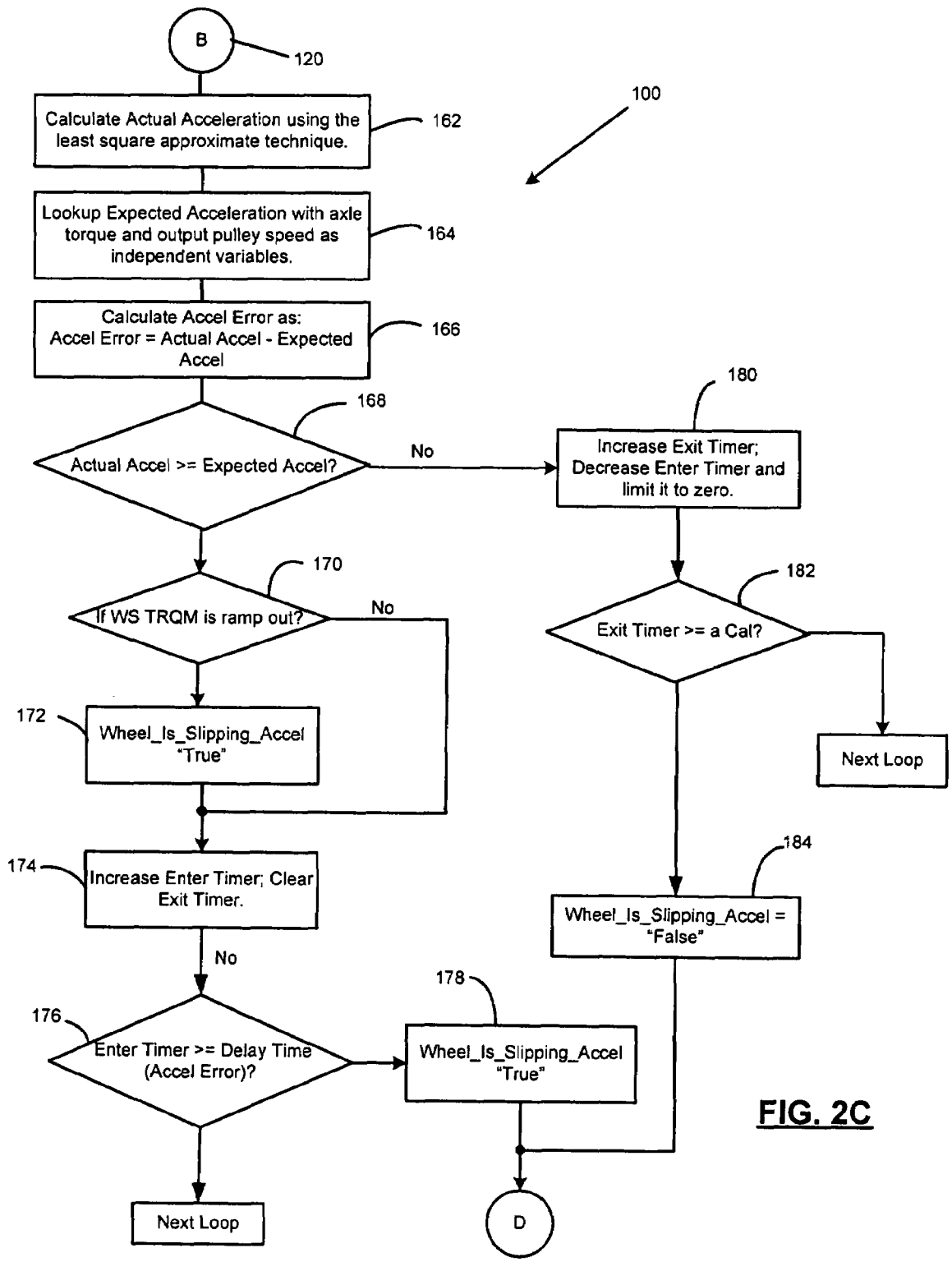
FIG. 2C is a flow diagram illustrating steps for controlling traction in a vehicle according to one embodiment of the present invention.

Referring now to FIGS. 2A and 2C, the controller 20 executes acceleration-based wheel slip detection. Acceleration-based wheel-slip detection is described in U.S. Pat. No. 6,182,002 B1, issued on Jan. 30, 2001 and assigned to the assignee hereof and acceleration-based detection is also described in Research Disclosure Publication Number 464034, both of which are incorporated herein by reference in their entirety.

In the present embodiment, wheel slip is detected when an actual vehicle acceleration exceeds a maximum acceleration achievable by the vehicle 10 for current conditions. Referring now to FIG. 2C, actual acceleration is determined using least-squares approximation in step 162. In step 164, axle torque and output pulley speed are used as independent variables to determine expected acceleration from a lookup table. In step 166, expected acceleration is subtracted from actual acceleration to determine acceleration error. If actual acceleration equals or exceeds expected acceleration in step 168, and if wheel-slip torque management is being ramped out in step 170, a signal Wheel_Is_Slipping_Accel is set to "True" in step 172. In step 174, an acceleration-case entry timer is incremented and an acceleration-case exit timer is cleared.

The controller compares the acceleration-case enter timer to a delay time based on acceleration error in step 176. If the enter timer equals or exceeds the delay time, the signal Wheel_Is_Slipping_Accel is set to "True" in step 178 and the controller 20 performs torque management in FIG. 2D.

If actual acceleration does not equal or exceed expected acceleration in step 168, the controller 20 increments the acceleration-case exit timer and decrements the acceleration-case enter timer in step 180. If the exit timer equals or exceeds a calibration value in step 182, the signal Wheel_Is_Slipping_Accel is set to "False" in step 184. The controller performs torque management in FIG. 2D.

Figure 2D:
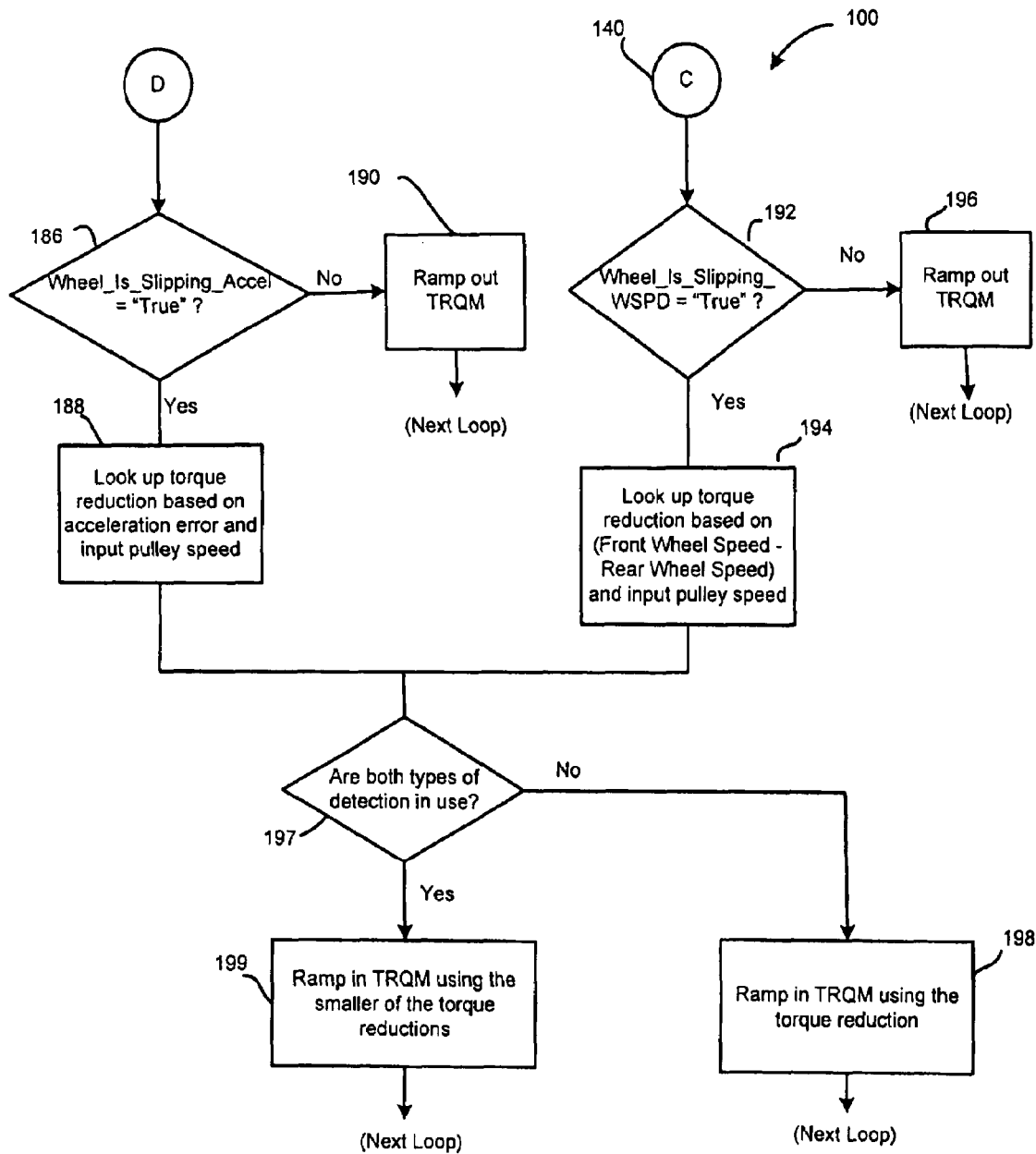
FIG. 2D is a flow diagram illustrating steps for controlling traction in a vehicle according to one embodiment of the present invention.

Referring now to FIG. 2D, the controller 20 performs torque management in a manner dependent on the type(s) of wheel slip detection being used. If the signal Wheel_Is_Slipping_Accel is "True" in step 186, the controller 20 determines an applicable torque reduction based on acceleration error and input pulley speed in step 188. If the signal Wheel_Is_Slipping_Accel is "False" in step 186, the controller ramps out torque management in step 190 and proceeds to perform another loop.

If the signal Wheel_Is_Slipping_WSPD is "True" in step 192, the controller determines an applicable torque reduction based on input pulley speed and speed difference between driven and non-driven wheels in step 194. If step 192 is "False", the controller 20 ramps out torque management in step 196 and performs another loop.

If only one type of wheel slip detection is being executed as determined in step 197, the controller ramps in torque management in step 198. Step 198 applies the torque reduction determined in step 188 or step 194 and control performs another loop. If both types of wheel detection are being used as determined in step 197, the controller 20 ramps in torque management. Step 199 uses the smaller value of the torque reductions determined in steps 188 and 194 and control performs another loop.

While torque management is performed in the present embodiment, the controller 20 specifies a transmission speed ratio that is based on a current vehicle speed. Thus a speed ratio is increased in the event of wheel slippage. To avoid component slippage, the controller also specifies a line pressure to the transmission based on the specified speed ratio.

It should be noted that wheel slip detection methods and torque management may differ in other embodiments. For example, wheel speed acceleration is not used to detect wheel slip, for example, as shown in step 124 (shown in FIG. 2B). Accordingly, the value Deriv_Cal_Ent is set to a minimum value and Deriv_Cal_Ext is set to a maximum value in such an embodiment.

In another embodiment, a vehicle does not have a driven wheel speed sensor. Output pulley speed and/or output pulley speed acceleration may be used instead of the driven wheel speed and/or the driven wheel speed acceleration. In yet another embodiment, wheel slippage is controlled by controlling maximum front and rear wheel speeds. In still another embodiment, wheel slip is detected by comparing an average of driven wheel speeds to a non-driven wheel speed.

A vehicle with a multiple-speed transmission can be provided with traction control by programming a controller and providing one wheel sensor. Traction control thus can be easily installed in many types of vehicles, including but not limited to vehicles without ABS. Since more than one type of slip detection can be used, various types of slippage can be detected and driving can be made safer. Because torque reduction control is improved, vehicle driveability also is improved.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method of controlling traction in a vehicle having at least one non-driven wheel speed sensor, the method comprising:
   detecting at least one of actual vehicle acceleration and a wheel speed difference;
   comparing said at least one of said actual vehicle acceleration and said wheel speed difference to at least one of a predetermined vehicle acceleration and a predetermined wheel speed difference to detect vehicle wheel slip; and
   reducing wheel torque in response to said detected wheel slip based upon vehicle acceleration using a least squares approach or a wheel speed difference; said method further comprising:
   comparing a non-driven wheel speed to a threshold non-driven wheel speed value and trans throttle value to a threshold throttle value to obtain a comparison result; and
   selecting a wheel slip detection method based on said comparison result.

2. The method of claim 1 wherein said comparing step further includes:
   detecting a wheel speed acceleration; and
   comparing said wheel speed acceleration to a predetermined wheel speed acceleration to detect wheel slip.

3. The method of claim 1 further comprising:
   specifying a transmission speed ratio based on a current vehicle speed; and
   providing a line pressure in the transmission based on the specified speed ratio.

4. A method of controlling traction in a vehicle having at least one non-driven wheel speed sensor, the method comprising:
   detecting at least one of actual vehicle acceleration and a wheel speed difference;
   comparing said at least one of said actual vehicle acceleration and said wheel speed difference to at least one of a predetermined vehicle acceleration and a predetermined wheel speed difference to detect vehicle wheel slip; and
   reducing wheel torque in response to said detected wheel slip based upon vehicle acceleration using a least squares approximation or a wheel speed difference; wherein said step of reducing wheel torque comprises accessing a table of torque reduction values based on input pulley speed and at least one of an acceleration error and a wheel speed difference.

5. A method of controlling traction in a vehicle having at least one non-driven wheel speed sensor, the method comprising:
   detecting at least one of actual vehicle acceleration and a wheel speed difference;
   comparing said at least one of said actual vehicle acceleration and said wheel speed difference to at least one of a predetermined vehicle acceleration and a predetermined wheel speed difference to detect vehicle wheel slip; and
   reducing wheel torque in response to said detected wheel slip based upon vehicle acceleration using a least squares approximation or a wheel speed difference; said method further comprising:
   determining a first torque reduction amount based on at least one of acceleration error and input pulley speed;
   determining a second torque reduction amount based on at least one of input pulley speed and speed difference between driven and non-driven wheels; and
   reducing wheel torque using a lesser of the reduction amounts.

6. A method of controlling traction in a vehicle having at least one non-driven wheel speed sensor, the method comprising:
   detecting a non-driven wheel speed and a throttle position;
   comparing said non-driven wheel speed and said throttle position to a predetermined non-driven wheel speed and a predetermined throttle position;
   selecting one of a plurality of wheel slip detection methods based on said comparing step; and
   wherein a first wheel slip detection method detects a speed difference of driven and non-driven wheels and compares said speed difference of driven and non-driven wheels to a predetermined difference, and wherein a second wheel slip detection method detects vehicle acceleration and compares said vehicle acceleration to a predetermined vehicle acceleration.

7. The method of claim 6 further comprising performing said plurality of wheel slip detection methods.

8. The method of claim 6 wherein comparing said speed difference further includes:
   detecting a driven wheel speed acceleration; and
   comparing said driven wheel speed acceleration to a predetermined driven wheel speed acceleration.

9. The method of claim 6, further comprising applying a torque reduction to a wheel based on said selected wheel slip detection method.

10. The method of claim 6 further comprising reducing a wheel torque based on a result of the selected wheel slip detection method.

11. The method of claim 10 wherein reducing a wheel torque comprises using an input pulley speed and a speed difference between driven and non-driven wheels to define a torque reduction.

12. The method of claim 10 wherein reducing a wheel torque comprises using an acceleration error and an input pulley speed to define a torque reduction.

13. A method of controlling traction in a vehicle having at least one non-driven wheel speed sensor, the method comprising:
    detecting at least one of actual vehicle acceleration and a wheel speed difference;
    generating a first torque request to a vehicle controller based on an acceleration based slip determined using a least squares approximation;

generating a second torque request to a vehicle controller based on a wheel speed difference slip; and varying wheel torque using the lowest value of either said first torque request or said second torque request.

14. The method of claim 13 wherein varying the wheel torque comprises reducing the wheel torque.

* * * * *